United States Patent [19]
Moppert

[11] Patent Number: 5,839,698
[45] Date of Patent: Nov. 24, 1998

[54] CONTROL SURFACE CONTINUOUS SEAL

[75] Inventor: Joseph C. Moppert, Torrence, Calif.

[73] Assignee: Northrop Grumman Corporation, Los Angeles, Calif.

[21] Appl. No.: 958,717

[22] Filed: Oct. 23, 1997

[51] Int. Cl.⁶ .................................................... B64C 9/06
[52] U.S. Cl. ........................ 244/217; 244/75 R; 244/215; 244/219; 244/214
[58] Field of Search ..................................... 244/213, 214, 244/215, 216, 217, 218, 219, 75 R

[56] References Cited

U.S. PATENT DOCUMENTS

| | | | |
|---|---|---|---|
| 2,279,615 | 4/1942 | Bugatti | 244/217 |
| 2,295,172 | 9/1942 | Evny | 244/215 |
| 5,655,737 | 8/1997 | Williams et al. | 244/217 |

FOREIGN PATENT DOCUMENTS

| | | | |
|---|---|---|---|
| 871113 | 4/1942 | France | 244/217 |

*Primary Examiner*—Galen Barefoot
*Attorney, Agent, or Firm*—Terry J. Anderson; Karl J. Hoch, Jr.

[57] ABSTRACT

A continuous skin and seal airfoil comprises a rigid structural wing box located centrally chordwise and extending spanwise and including a spanwise extending spar, an upper skin surface and a lower skin surface. Upper and lower control surfaces are pivotally mounted on the spar for movement about a spanwise extending axis between an elevated position and a lowered position and includes an upper skin surface. In similar fashion, a lower control surface is pivotally mounted on the wing box for movement about a spanwise extending axis between an elevated position and a lowered position and includes a lower skin surface. An upper seal member extends spanwise and is fixed to both the wing box and to the upper control surface. Similarly, a lower seal member extends spanwise and is fixed to both the wing box and to the lower control surface. Actuators move the control surfaces between an elevated position and a lowered position. Positioners maintain the upper and lower seals in a substantially zero tension state as the upper and lower control surfaces are moved between the elevated and the lowered positions. The positioners include an extensible upper positioner extending between and pivotally mounted to the spar and to the upper control surface, respectively, and an extensible lower positioner extending between and pivotally mounted to the spar and to the lower control surface, respectively.

11 Claims, 2 Drawing Sheets

CONTROL SURFACE CONTINUOUS SEAL

BACKGROUND OF THE INVENTION

1. Field of the Invention

The present invention relates generally to aircraft control surfaces and, more particularly, to a continuous seal construction to maintain smooth flow over the aerodynamic surfaces of the aircraft at all positions of the control surfaces.

2. Description of the Prior Art

Almost since the advent of aviation, efforts have been made to reduce or eliminate the gap which exists between fixed and movable aerodynamic surfaces in aircraft. These efforts have increased as flight speeds have become ever greater.

There are numerous examples in the patent literature which display such efforts. For example, U.S. Pat. No. 1,817,651 issued Aug. 4, 1931 to Schroeder discloses the use of flexible sheathing employed to overlie the open recess or gap formed at both the front and the rear pivotal control surfaces.

U.S. Pat. No. 1,846,146 issued Feb. 23, 1932 to Rocheville discloses a wing section having a pivotal flap with an overlapping covering over the opening between the flap and the wing.

U.S. Pat. Nos. 3,994,452 issued Nov. 30, 1976 Cole and 4,200,253 issued Apr. 29, 1980 to Rowarth disclose both upper and lower flexible end sections attached to a fixed wing section.

The following U.S. patents disclose a pivotal end section of a wing that has an upper flexible section and a lower slidable section mounted to the wing such that on pivotal motion no open gaps exists between the flap section and the wing:

| Patent No. | Inventor(s) | Issued |
| --- | --- | --- |
| 4,053,124 | Cole | 10/11/77 |
| 4,351,502 | Statkus | 09/28/82 |
| 4,427,169 | Brown | 01/24/84 |
| 4,553,722 | Cole | 11/19/85 |
| 4,706,913 | Cole | 11/17/87. |

U.S. Pat. No. 4,230,295 issued Oct. 28, 1980 to Eppler discloses the use of a flexible membrane covering the gap between a wing and a trailing edge flap with a lower section on the edge flap that slides along the inside of the lower wing surface.

U.S. Pat. No. 4,361,299 issued Nov. 30, 1982 to Sharrock discloses an inextensible skin portion 11 anchored to both a pivotal flap and the wing to provide a smooth and continuous surface.

U.S. Pat. No. 4,471,927 issued Sep. 18, 1984 to Rudolph et al. discloses a flexible skin panel provided between the upper wing surface and the adjacent pivotal flap member.

It was with knowledge of the foregoing disclosures representative of the state of the art that the present invention was conceived and has now been reduced to practice.

SUMMARY OF THE INVENTION

The present invention relates to a continuous skin flexible seal airfoil which comprises a rigid structural wing box located centrally chordwise and extending spanwise and including a spanwise extending spar, an upper skin surface and a lower skin surface. Upper and lower control surfaces are pivotally mounted on the spar for movement about a spanwise extending axis between elevated and lowered positions. An upper seal member extends spanwise and is fixed to both the wing box and to the upper control surface. Similarly, a lower seal member extends spanwise and is fixed to both the wing box and to the lower control surface. Actuators move the control surfaces between the elevated and lowered positions and positioners maintain the upper and lower seals in a substantially zero tension state as the upper and lower control surfaces are moved. The positioners include an extensible upper positioner extending between and pivotally mounted to the spar and to the upper control surface, respectively, and an extensible lower positioner extending between and pivotally mounted to the spar and to the lower control surface, respectively.

The invention may include a metallic or composite seal which can be used on an aileron, elevator, leading edge flap, trailing edge flap, rudder, elevon, or some combination of these types of control surfaces. The upper surface and the lower surface of the control surface are separated along a reference plane and can move separately from each other or in unison. There is an upper and lower surface continuous aerodynamic gap seal, which maintains a continuous smooth mold line surface for the wing upper and lower contour. In order to accomplish this action, the upper and lower surface segments or units are attached to separate tracks through rollers that allow each segment to move forward or aft when the control surface is deflected, in order to locate each unit with respect to the flexing gap seals. Each track is rotated on a common hinge line. The control segments are located with respect to the seals by a positioner to prevent a tension or compression load from being applied to the seals. The seal is only designed to flex or bend. The seal may be made from composite, aluminum, titanium or steel, for example, to be compatible with temperature requirements, according to the speed envelope of the aircraft utilizing the invention. Each upper and lower control surface unit can be preloaded together to prevent gaps, and if used as an elevon or aileron, the units can be separated to form a drag surface.

Accordingly, a primary object of the present invention is to provide a continuous seal construction to maintain smooth flow over the aerodynamic surfaces of the aircraft at all positions of the control surfaces.

Another object of the present invention is to provide a seal construction between the upper and lower surfaces of fixed and movable aerodynamic surfaces, respectively, of an aircraft allowing the seal construction to flex but not the stretch or compress when the movable surfaces are actuated.

A further object of the invention is to provide a continuous skin and seal airfoil which comprises upper and lower control surfaces which are pivotally mounted for movement about a spanwise extending axis between elevated and lowered positions, upper and lower seal member extending spanwise and fixed to both the wing box and to their respective upper and lower control surfaces skins, actuators moving the control surfaces between elevated and lowered positions and positioners maintaining the upper and lower seals in a substantially zero tension state as the upper and lower control surfaces are moved between the elevated and the lowered positions.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
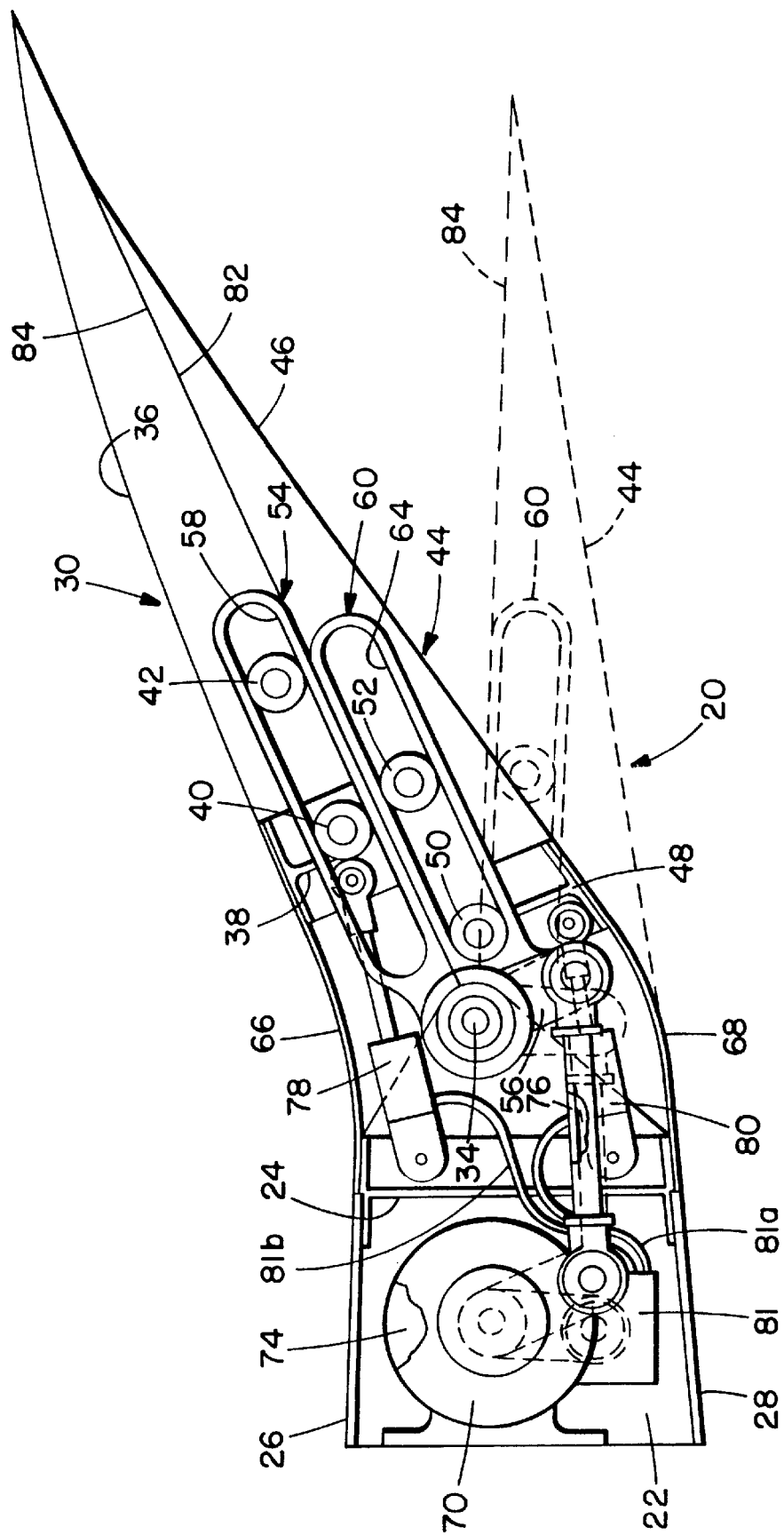
FIG. 1 is a cross section view in elevation of a portion of the wing of an aircraft embodying the invention.
Figure 2:
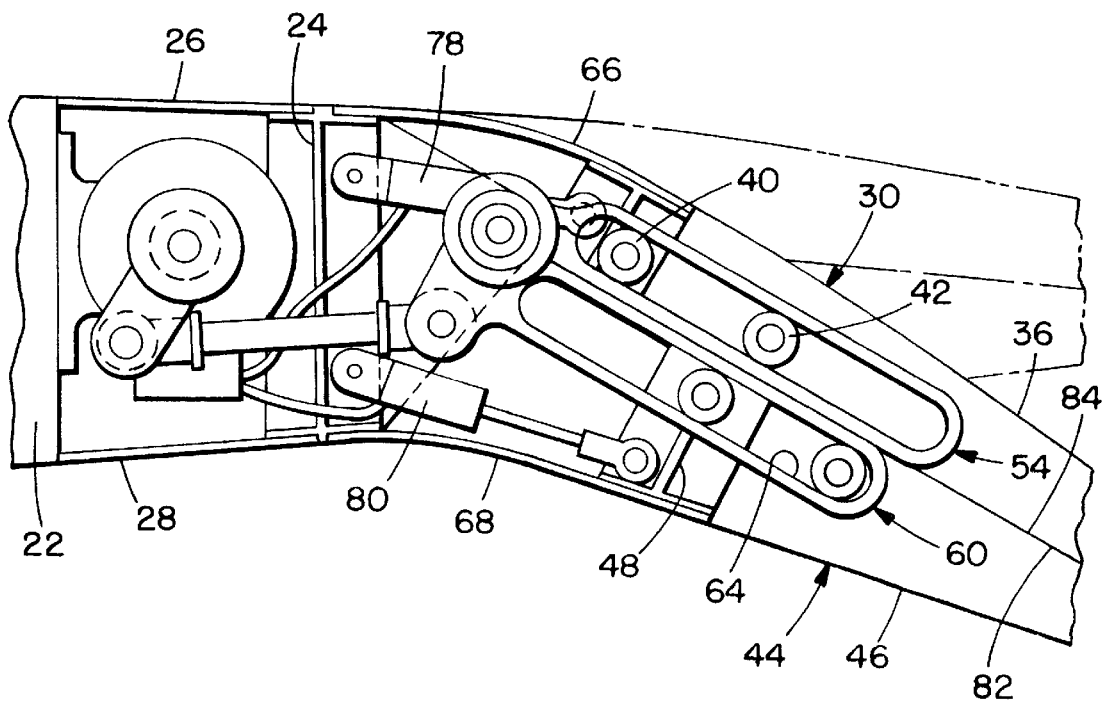
FIG. 2 is a cross section view similar to FIG. 1 and illustrating another position of the components of the aircraft wing.

Turn now to the drawings and, initially, to FIGS. 1 and 2 which generally illustrate a continuous skin airfoil 20 embodying the present invention which comprises a rigid structural wing box 22 located centrally chordwise (left and right as viewed) and extending spanwise (into and out of the plane of the paper as viewed) and including a spanwise extending spar 24, an upper skin surface 26 and a lower skin surface 28.

An upper control surface 30 is pivotally mounted on the spar 24 for movement about a spanwise extending axis 34 between a neutral phantom line position shown in FIG. 2, an elevated solid line position shown in FIG. 1 and a lowered solid line position shown in FIG. 2. The upper control surface 30 includes an upper skin surface 36, a spanwise extending upper auxiliary spar 38 and a pair of chordwise spaced upper rollers 40, 42 rotatably mounted on the upper control surface for rotation about parallel spanwise extending axes. In similar fashion, a lower control surface 44 is pivotally mounted on the spar 24 for movement about a spanwise extending axis between an elevated and lowered positions. The lower control surface 44 includes a lower skin surface 46, a spanwise extending lower auxiliary spar 48 and a pair of chordwise spaced lower rollers 50, 52 rotatably mounted on the lower control surface for rotation about parallel spanwise extending axes.

An upper track member 54 includes an integral transversely extending pivot arm 56 and has an elongated slot 58 with which the upper rollers 40, 42 are rollingly engaged. A lower track member 60 similarly includes an integral transversely extending pivot arm 62 and has an elongated slot 64 with which the lower rollers 50, 52 are rollingly engaged.

An upper seal member 66 which is of suitable sheet material, metallic or composite, extends spanwise and between and is fixed to the spar 24 and to the upper auxiliary spar 38, respectively. In this manner, the upper seal member 66 is substantially coplanar with the upper skin surfaces 26 and 36. A lower seal member 68, similar to the upper seal member 66, extends spanwise and between and is fixed to the wing box and to the lower control surface, respectively, so as to be substantially coplanar with the lower skin surfaces 28 and 46.

An upper control surface actuator 70 is mounted on the wing box 22 and an elongated upper actuator rod 72 pivotally connects the upper control surface actuator and the pivot arm 56 for the upper track member 54. The upper control surface actuator 70 is operable to move, through the upper actuator rod 72, the upper control surface between the elevated and lowered positions. Similarly, a lower control surface actuator 74, shown in FIG. 1 as being axially aligned with upper control surface actuator 70, is mounted on the wing box 22 and an elongated lower actuator rod 76 generally obscured by the upper actuator rod 72 in FIGS. 1 and 2, pivotally connects the lower control surface actuator and the pivot arm 62 for the lower track member. The lower control surface actuator is operable to move, through the lower actuator rod, the lower control surface between the elevated and lowered positions.

An extensible upper positioner 78 includes a suitable actuating device, perhaps of a hydraulic, electric, or pneumatic nature. The positioner extends between and is pivotally mounted to the spar 24 and to the upper auxiliary spar 38, respectively. In similar fashion, an extensible lower positioner 80 extends between and is pivotally mounted to the spar 24 and to the lower auxiliary spar 48, respectively. The upper and lower positioners 78, 80 are operable to maintain the upper and lower seals in a substantially zero tension state as the upper and lower control surfaces are moved by the upper and lower control surface actuators, respectively, between the elevated and the lowered positions. The positioners 78, 80 are operated by differential valves or switches 81 illustrated with appropriate conduit interconnections 81a and 81b so that they can move the correct distance to satisfy the movement requirements of the particular wing design in question. They operate in conjunction with the upper and lower actuators 70, 74. This differential operation of parts has been long known and each separate wing design has special requirements for control surface movement and the positioner movement is designed to meet the operating requirements accordingly.

The upper control surface 30 has a lower interface surface 82 and the lower control surface 44 has an upper interface surface 84. The upper and lower interface surfaces 82, 84 are slidably engaged for mutual relative movement generally in a chordwise direction as the upper and lower control surfaces are moved as a unit by the upper and lower control surface actuators 70, 72 between the elevated and the lowered positions. During normal operation when the control surfaces 30, 44 are operated as a unit, the actuators 70, 74 serve to maintain the upper and lower interface surfaces 82, 84 in engagement. However, other operation may be indicated. That is, the upper and lower control surface actuators may be differentially operable to simultaneously move the upper control surface 30 toward the elevated position (as illustrated by solid lines in FIG. 1) and the lower control surface 44 toward the lowered position (as illustrated by dashed lines in FIG. 1).

Figure 3:
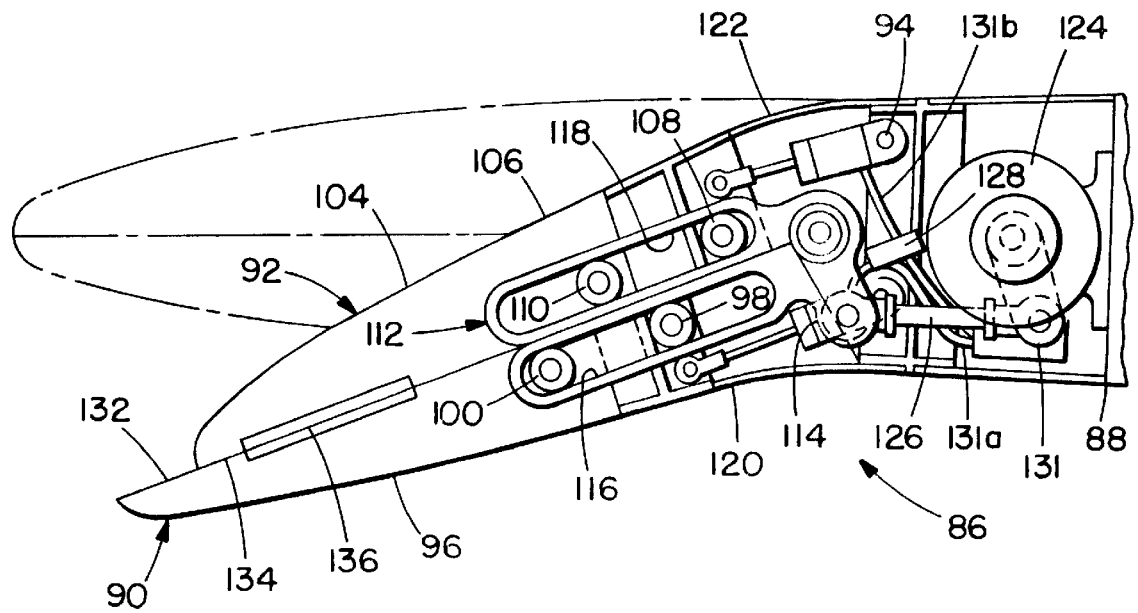
FIG. 3 is a cross section view in elevation of another embodiment of the invention, illustrating a leading edge flap embodying the invention.

Turn now to FIG. 3 which illustrates another embodiment of the invention. In this instance, a continuous skin and seal airfoil 86 comprises a rigid structural wing box 88, and upper and lower control surfaces 90, 92 pivotally mounted on a spar 94 integral with the wing box. As with the control surfaces 30, 44, the control surfaces 90, 92 are movable about a spanwise extending axis between an elevated position and a lowered position. The upper control surface 90 includes an upper skin surface 96, a spanwise extending upper auxiliary spar 98 and a pair of chordwise spaced upper rollers 100, 102 rotatably mounted on the upper control surface for rotation about parallel spanwise extending axes. Similarly, the lower control surface 92 includes a lower skin surface 104, a spanwise extending lower auxiliary spar 106, and a pair of chordwise spaced lower rollers 108, 110 rotatably mounted on the lower control surface for rotation about parallel spanwise extending axes.

A single track member 112 includes an integral pivot arm 114 formed with an upper elongated slot 116 with which the upper rollers 100, 102 are rollingly engaged. The single track member 112 is also formed with a lower elongated slot 118 with which the lower rollers 108, 110 are rollingly engaged.

An upper seal member 120 extends spanwise and between and fixed to the wing box 88 and to the upper control surface 90, respectively, so as to be substantially coplanar with the upper skin surfaces of those components. Similarly, a lower seal member 122 extends spanwise and between and fixed to the wing box 88 and to the lower control surface 92, respectively, so as to be substantially coplanar with the lower skin surfaces of those components.

For this embodiment, a single control surface actuator 124 is suitably mounted on the wing box and an elongated actuator rod 126 pivotally connects the actuator and the pivot arm 114 for the track member 112. The control surface actuator is operable to move the upper and lower control surfaces between the elevated and lowered positions, through the actuator rod.

Similar to the earlier described embodiment, an extensible upper positioner 128 extends between and is pivotally mounted to the spar 94 and to the upper auxiliary spar 98, respectively, and an extensible lower positioner 130 extends between and is pivotally mounted to the spar 94 and to the lower auxiliary spar 106, respectively. As earlier described with respect to the previous embodiment, the upper and lower positioners 128, 130 are operable to maintain the upper and lower seals in a substantially zero tension state as the upper and lower control surfaces 90, 92 are moved by the actuator 124 between the elevated and the lowered positions. Also, as in the previous embodiment, the positioners 128, 130 are operated by differential valves or switches 131 illustrated with appropriate conduit interconnections 131*a* and 131*b* so that they can move the correct distance to satisfy the movement requirements of the particular wing design in question. They operate in conjunction with the actuator 124.

Again, as with the previously described embodiment, in the modified airfoil 86, the upper control surface 90 has a lower interface surface 132 and the lower control surface 92 has an upper interface surface 134. The upper and lower interface surfaces 132, 134 are slidably engaged for mutual relative movement generally in a chordwise direction as the upper and lower control surfaces are moved as a unit by the actuator 124 between the elevated and the lowered positions. In this instance, however, a suitable key mechanism 136, which may be of conventional design, is provided for maintaining the upper and lower interface surfaces 132, 134 slidably engaged as the upper and lower control surfaces 90, 92 move as a unit between the elevated position and the lowered position.

The airfoil 86 is typical of a leading edge flap or slat device employed for changing the camber of an airfoil, for example, during low speed flight, such as on take-off and on landing.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A continuous skin and seal airfoil comprising:
    a rigid structural wing box located centrally chordwise and extending spanwise and including a spanwise extending spar, an upper skin surface and a lower skin surface;
    an upper control surface pivotally mounted on said spar for movement about a spanwise extending axis between an elevated position and a lowered position, said upper control surface including an upper skin surface, a spanwise extending upper auxiliary spar and a pair of chordwise spaced upper rollers rotatably mounted on said upper control surface for rotation about parallel spanwise extending axes;
    a lower control surface pivotally mounted on said wing box for movement about a spanwise extending axis between an elevated position and a lowered position, said lower control surface including a lower skin surface, a spanwise extending lower auxiliary spar and a pair of chordwise spaced lower rollers rotatably mounted on said lower control surface for rotation about parallel spanwise extending axes;
    an upper track member including an integral pivot arm and having an elongated slot therein, said upper rollers being rollingly engaged therewith;
    a lower track member including an integral pivot arm and having an elongated slot therein, said lower rollers being rollingly engaged therewith;
    an upper seal member extending spanwise and between and fixed to said wing box and to said upper control surface, respectively, so as to be substantially coplanar with said upper skin surfaces thereof;
    a lower seal member extending spanwise and between and fixed to said wing box and to said lower control surface, respectively, so as to be substantially coplanar with said lower skin surfaces thereof;
    an upper control surface actuator mounted on said wing box;
    an elongated upper actuator rod pivotally connecting said upper control surface actuator and said pivot arm for said upper track member, said upper control surface actuator being operable to move, through said upper actuator rod, said upper control surface between the elevated and lowered positions;
    a lower control surface actuator mounted on said wing box;
    an elongated lower actuator rod pivotally connecting said lower control surface actuator and said pivot arm for said lower track member, said lower control surface actuator being operable to move, through said lower actuator rod, said lower control surface between the elevated and lowered positions;
    an extensible upper positioner extending between and pivotally mounted to said spar and to said upper auxiliary spar, respectively; and
    an extensible lower positioner extending between and pivotally mounted to said spar and to said lower auxiliary spar, respectively;
    said upper and lower positioners being operable to maintain said upper and lower seals in a substantially zero tension state as said upper and lower control surfaces are moved by said upper and lower control surface actuators, respectively, between the elevated and the lowered positions.

2. A continuous skin and seal airfoil as set forth in claim 1 wherein said upper control surface has a lower interface surface; and
    wherein said lower control surface has an upper interface surface;
    said upper and lower interface surfaces being slidably engaged for mutual relative movement generally in a chordwise direction as said upper and lower control surfaces are moved as a unit by said upper and lower control surface actuators between the elevated and the lowered positions.

3. A continuous skin and seal airfoil as set forth in claim 1 wherein said upper and lower control surface actuators are differentially operable to simultaneously move said upper control surface toward the elevated position and said lower control surface toward the lowered position.

4. A continuous skin and seal airfoil comprising:

a rigid structural wing box located centrally chordwise and extending spanwise and including a spanwise extending spar, an upper skin surface and a lower skin surface;

an upper control surface pivotally mounted on said spar for movement about a spanwise extending axis between an elevated position and a lowered position, said upper control surface including an upper skin surface, a spanwise extending upper auxiliary spar and a pair of chordwise spaced upper rollers rotatably mounted on said upper control surface for rotation about parallel spanwise extending axes;

a lower control surface pivotally mounted on said wing box for movement about a spanwise extending axis between an elevated position and a lowered position, said lower control surface including a lower skin surface, a spanwise extending lower auxiliary spar and a pair of chordwise spaced lower rollers rotatably mounted on said lower control surface for rotation about parallel spanwise extending axes;

a track member including an integral pivot arm and having an upper elongated slot therein, said upper rollers being rollingly engaged therewith, and a lower elongated slot therein, said lower rollers being rollingly engaged therewith;

an upper seal member extending spanwise and between and fixed to said wing box and to said upper control surface, respectively, so as to be substantially coplanar with said upper skin surfaces thereof;

a lower seal member extending spanwise and between and fixed to said wing box and to said lower control surface, respectively, so as to be substantially coplanar with said lower skin surfaces thereof;

a control surface actuator mounted on said wing box;

an elongated actuator rod pivotally connecting said control surface actuator and said pivot arm for said track member, said control surface actuator being operable to move, through said actuator rod, said upper and lower control surfaces between the elevated and lowered positions;

an extensible upper positioner extending between and pivotally mounted to said spar and to said upper auxiliary spar, respectively;

an extensible lower positioner extending between and pivotally mounted to said spar and to said lower auxiliary spar, respectively;

said upper and lower positioners being operable to maintain said upper and lower seals in a substantially zero tension state as said upper and lower control surfaces are moved by said upper and lower control surface actuators, respectively, between the elevated and the lowered positions.

5. A continuous skin and seal airfoil as set forth in claim 4 wherein said upper control surface has a lower interface surface; and wherein said lower control surface has an upper interface surface;

said upper and lower interface surfaces being slidably engaged for mutual relative movement generally in a chordwise direction as said upper and lower control surfaces are moved as a unit by said upper and lower control surface actuators between the elevated and the lowered positions; and including:

key means for maintaining said upper and lower interface surfaces slidably engaged as said upper and lower control surfaces move as a unit between the elevated position and the lowered position.

6. A continuous skin and seal airfoil comprising:

a rigid structural wing box located centrally chordwise and extending spanwise and including a spanwise extending spar, an upper skin surface and a lower skin surface;

an upper control surface pivotally mounted on said spar for movement about a spanwise extending axis between an elevated position and a lowered position, said upper control surface including an upper skin surface, a spanwise extending upper auxiliary spar and a pair of chordwise spaced upper rollers rotatably mounted on said upper control surface for rotation about parallel spanwise extending axes;

a lower control surface pivotally mounted on said wing box for movement about a spanwise extending axis between an elevated position and a lowered position, said lower control surface including a lower skin surface, a spanwise extending lower auxiliary spar and a pair of chordwise spaced lower rollers rotatably mounted on said lower control surface for rotation about parallel spanwise extending axes;

an upper seal member extending spanwise and between and fixed to said wing box and to said upper control surface, respectively, so as to be substantially coplanar with said upper skin surfaces thereof;

a lower seal member extending spanwise and between and fixed to said wing box and to said lower control surface, respectively, so as to be substantially coplanar with said lower skin surfaces thereof;

actuating means for moving said upper control surface and said lower control surface, respectively, between an elevated position and a lowered position;

an extensible upper positioner extending between and pivotally mounted to said spar and to said upper auxiliary spar, respectively; and an extensible lower positioner extending between and pivotally mounted to said spar and to said lower auxiliary spar, respectively;

said upper and lower positioners being operable to maintain said upper and lower seals in a substantially zero tension state as said upper and lower control surfaces are moved by said upper and lower control surface actuators, respectively, between the elevated and the lowered positions.

7. A continuous skin and seal airfoil as set forth in claim 6 wherein said upper control surface has a lower interface surface; and wherein said lower control surface has an upper interface surface;

said upper and lower interface surfaces being slidably engaged for mutual relative movement generally in a chordwise direction as said upper and lower control surfaces are moved as a unit by said actuating means between the elevated and the lowered positions.

8. A continuous skin and seal airfoil as set forth in claim 6 wherein said upper and lower control surface actuators are differentially operable to simultaneously move said upper control surface toward the elevated position and said lower control surface toward the lowered position.

9. A continuous skin and seal airfoil as set forth in claim 6 wherein said upper control surface has a lower interface surface; and wherein said lower control surface has an upper interface surface;

said upper and lower interface surfaces being slidably engaged for mutual relative movement generally in a chordwise direction as said upper and lower control surfaces are moved as a unit by said upper and lower control surface actuators between the elevated and the lowered positions; and including:
key means for maintaining said upper and lower interface surfaces slidably engaged as said upper and lower control surfaces move as a unit between the elevated position and the lowered position.

10. A continuous skin and seal airfoil comprising:

a rigid structural wing box located centrally chordwise and extending spanwise and including a spanwise extending spar, an upper skin surface and a lower skin surface;

an upper control surface pivotally mounted on said spar for movement about a spanwise extending axis between an elevated position and a lowered position, said upper control surface including an upper skin surface;

a lower control surface pivotally mounted on said wing box for movement about a spanwise extending axis between an elevated position and a lowered position, said lower control surface including a lower skin surface;

an upper seal member extending spanwise and between and fixed to said wing box and to said upper control surface, respectively, so as to be substantially coplanar with said upper skin surfaces thereof;

a lower seal member extending spanwise and between and fixed to said wing box and to said lower control surface, respectively, so as to be substantially coplanar with said lower skin surfaces thereof;

actuating means for moving said upper control surface and said lower control surface, respectively, between an elevated position and a lowered position;

positioner means for maintaining said upper and lower seals in a substantially zero tension state as said upper and lower control surfaces are moved by said upper and lower control surface actuators, respectively, between the elevated and the lowered positions.

11. A continuous skin and seal airfoil as set forth in claim 10 wherein said positioner means includes:
an extensible upper positioner extending between and pivotally mounted to said spar and to said upper auxiliary spar, respectively; and
an extensible lower positioner extending between and pivotally mounted to said spar and to said lower auxiliary spar, respectively.

* * * * *